(12) United States Patent
Taher et al.

(10) Patent No.: US 12,732,244 B2
(45) Date of Patent: Sep. 8, 2026

(54) POWER-EFFICIENT ANTENNA ARRAY CONTROL ARCHITECTURE

(71) Applicant: CesiumAstro, Inc., Austin, TX (US)

(72) Inventors: Tanim Taher, Round Rock, TX (US); Thomas Magesacher, Austin, TX (US); James Wesley McCoy, Leander, TX (US)

(73) Assignee: CesiumAstro, Inc., Austin, TX (US)

( * ) Notice: Subject to any disclaimer, the term of this patent is extended or adjusted under 35 U.S.C. 154(b) by 0 days.

(21) Appl. No.: 18/236,488

(22) Filed: Aug. 22, 2023

(65) Prior Publication Data

US 2026/0045987 A1 Feb. 12, 2026

Related U.S. Application Data

(60) Provisional application No. 63/400,026, filed on Aug. 22, 2022.

(51) Int. Cl.
*H04B 7/06* (2006.01)
*H01Q 3/34* (2006.01)
(Continued)

(52) U.S. Cl.
CPC ............. *H04B 7/0617* (2013.01); *H01Q 3/34* (2013.01); *H04B 7/043* (2013.01); *H04B 17/12* (2015.01); *H04B 17/221* (2023.05)

(58) Field of Classification Search
CPC .......... H04B 7/0617; H04B 2001/0425; H04B 1/0475; H04B 7/0408; H04B 7/0634; H04B 7/06952; H04B 7/0842; H04B 1/04; H03F 1/3247; H03F 1/3241; H03F 3/68; H03F 3/245; H03F 2200/451; H03F 3/189; H03F 3/24; H03F 2201/3215; H04W 72/046; H04W 72/11; H04W 72/21; H04W 4/38; H04W 4/70; H04W 84/18
See application file for complete search history.

(56) References Cited

U.S. PATENT DOCUMENTS 8,351,543 B2 * 1/2013 Kenington ................ H03F 3/24 375/267
9,762,302 B1 * 9/2017 Shaked ................ H04B 7/0417
(Continued)

*Primary Examiner* — Eva Y Puente
(74) *Attorney, Agent, or Firm* — Hogan Lovells Cadwalader US LLP

(57) ABSTRACT

A system may include a digital beamformer (DBF) circuit coupled to N antenna elements of an analog front end. The DBF circuit may include a plurality of digital pre-distortion (DPD) blocks and a controller. Each DPD block may correspond to a transmission path that includes one of the N antenna elements. The controller may be configured to determine one or more parameters associated with the analog front end, selectively activate some, but not all, of the plurality of DPD blocks, and determine DPD data from the one or more DPD tables for each activated DPD block based on the one or more parameters. The controller may independently configure each activated DPD block with the determined DPD data to pre-compensate a signal on a per antenna element basis to negate non-linearities. These DPD Blocks can be independently configured to realize phased array architectures with reduced antenna array power consumption and heating.

17 Claims, 9 Drawing Sheets

(51) Int. Cl.

| | |
|---|---|
| ***H04B 7/0426*** | (2017.01) |
| ***H04B 17/12*** | (2015.01) |
| ***H04B 17/21*** | (2015.01) |

(56) References Cited

U.S. PATENT DOCUMENTS

| | | | | |
|---|---|---|---|---|
| 11,283,666 | B1 * | 3/2022 | McCormick | H04L 27/367 |
| 2009/0184763 | A1 * | 7/2009 | Kim | H03F 3/68<br>330/124 R |
| 2016/0093950 | A1 * | 3/2016 | Cummings | H01Q 3/04<br>342/359 |
| 2019/0238204 | A1 * | 8/2019 | Kim | H03F 3/24 |
| 2022/0006430 | A1 * | 1/2022 | Rexberg | H03F 1/3258 |
| 2022/0190851 | A1 * | 6/2022 | Pawliuk | H04B 1/0475 |
| 2022/0385313 | A1 * | 12/2022 | Drogi | H04B 1/04 |
| 2023/0387861 | A1 * | 11/2023 | Maxim | H03F 3/213 |

* cited by examiner

POWER-EFFICIENT ANTENNA ARRAY CONTROL ARCHITECTURE

CROSS-REFERENCE TO RELATED APPLICATION(S)

The present disclosure is a nonprovisional of and claims priority to U.S. Provisional Patent Application No. 63/400,026 filed on Aug. 22, 2022 and entitled "Power-Efficient Antenna Array Control Architecture," which is incorporated herein by reference in its entirety.

FIELD

The present disclosure is generally related to systems and methods of transmitting radio frequency signals using antenna arrays, and more particularly to systems and methods of mitigating non-linear distortion and controlling power consumption in an antenna array architecture.

BACKGROUND

In general, circuitry may heat up during operation. Communication circuitry that generates signals for wireless transmission can heat up during operation, which may produce signal distortion that can introduce transmission errors.

Nonlinear hardware may cause signal distortion that can degrade the performance of the transmission channels (both in-band and out-of-band). In many instances, the power amplifiers may be one of the primary sources of nonlinear distortion.

SUMMARY

Embodiments of systems, methods, and devices are described below that may include a digital beamformer (DBF) circuit including a digital pre-distortion (DPD) block configured to counteract non-linear distortion on a per-antenna element basis in an antenna system, such as a phased array antenna system. The phased array antenna system can include a plurality of DBF circuits where each DBF circuit is coupled to a subset of antenna elements within the antenna array system. The DPD block may be configured by a controller of the digital beamformer circuit to pre-distort the signal to be transmitted on a per antenna element basis to cancel non-linear distortion introduced by a power amplifier in the transmission path. The controller may be configured to control the DPD block based on a temperature of a region of an analog front end, based on feedback signals from the analog front end, based on power levels of drive signals provided to power amplifiers of the analog front end, based on other data, or any combination thereof. Additionally, in some implementations the digital beamformer circuit may be configured to provide signals that may be used to control the power level of signals provided to the power amplifiers.

Several novel architectures for power-efficient digital beam-formed phased arrays are enabled by the digital beamforming circuit based on the per antenna element DPD functionality. At a system level, the DPD can be turned on or off or the amount or extend of pre-distortion may be adjusted for any antenna element or group of antenna elements in the array. Additionally, the digital beamformer circuit may be configured to control the drive level or bias point of each power amplifier individually. By selectively enabling the DPD functionality on a per element basis and by independently controlling the drive level or bias point of each power amplifier, the system may enable power efficient phased arrays by reducing overall power consumption in the digitally beamformed antenna array. Additionally, the DPD functionality coupled with the control of the drive level or bias point of each power amplifier may cooperate to enhance the linearity of the transmit path of the system.

In some implementations, a system may include a digital beamformer circuit coupled to an analog front end that is coupled to N antenna elements. The digital beamformer circuit may include an input/output (I/O) interface configured to couple to at least one second device, a plurality of digital pre-distortion (DPD) blocks, and a controller. Each DPD block may correspond to a transmission path that includes one of the N antenna elements. The controller may be configured to determine one or more parameters associated with the analog front end, selectively activate some, but not all, of the plurality of DPD blocks, and determine DPD data from the one or more DPD tables for each activated DPD block based on the one or more parameters. The controller may be configured to independently configure each activated DPD block with the determined DPD data to pre-compensate a signal on a per antenna element basis to negate non-linearities introduced by a power amplifier in the transmission path.

In other implementations, a system may include a digital beamformer circuit coupled to an analog front end that is coupled to N antenna elements. The digital beamformer circuit may include a plurality of digital pre-distortion (DPD) circuit blocks and a controller. Each DPD circuit block is in a transmission path associated with one of the N antenna elements. The controller may be configured to determine one or more parameters corresponding to the analog front end, determine DPD data from the one or more DPD tables for each DPD circuit block based on the one or more parameters, and send one or more control signals to control a power level or bias point for each power amplifier of the analog front end based on the determined DPD data. In some implementations, the controller may be further configured to independently configure each activated DPD circuit block with the determined DPD data to pre-compensate a signal on a per antenna element basis to negate non-linearities introduced by a power amplifier in the transmission path.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

Figure 1:
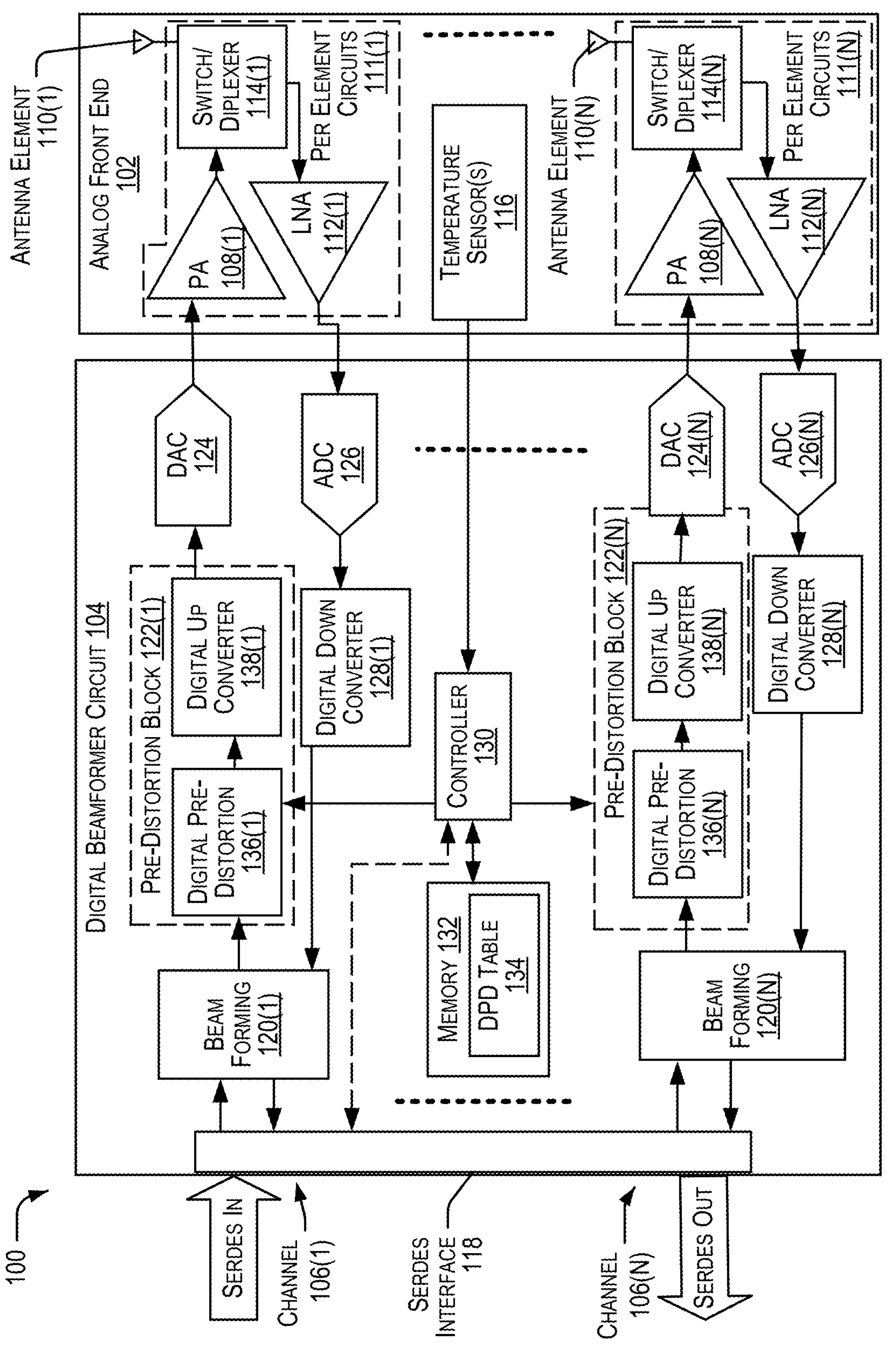
FIG. 1 depicts a block diagram of a system including a digital beamformer circuit configured to provide digital pre-distortion control based on temperature signals, in accordance with certain embodiments of the present disclosure.

While implementations are described in this disclosure by way of example, those skilled in the art will recognize that the implementations are not limited to the examples or figures described. The figures and detailed description thereto are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

Antenna arrays may send and receive radio frequency signals to other antenna arrays and to devices. The antenna array may include circuitry including power amplifiers (PAs), low-noise amplifiers (LNAs), and other circuitry. Typically, each antenna element is coupled to a PA in the transmission path and an LNA in the receive path. The PA may introduce non-linear distortion in the transmitted signal during operation as its temperature increases.

Typically, the center PAs in a phased array may operate at a higher temperature than PAs along a periphery or outer areas of the phased array. Accordingly, the center PAs may exhibit more non-linearity while the outer element PAs may operate at a lower temperature where they exhibit more linearity. In some instances, the power level of the center PA may have a higher bias point, while the PAs along the periphery or outer areas may have a lower bias point.

Embodiments of the systems, methods, and devices described below may include a digital beamformer circuit coupled to a phased array antenna system via an analog front end. The digital beamformer circuit may be configured to correct for the non-linear distortion introduced by the PAs of the analog front end on a per-antenna element basis using a digital pre-distortion (DPD) technology. The digital beamformer circuit may include a plurality of DPD circuit blocks, where each DPD circuit block is coupled to a transmit path of one of the antenna elements coupled to the analog front end. A controller of the digital beamformer circuit may be configured to independently control each DPD circuit block.

In one implementation in which the digital beamformer circuit does not include PA control, the controller of the digital beamformer circuit may receive temperature data corresponding to one or more regions of the analog front end and may selectively disable one or more DPD circuit blocks or may selectively adjust the pre-distortion amount based on the temperature data. In an example wherein the center PAs are hotter than the PAs along the outer edges, the controller may enable the DPD circuit blocks that are coupled to circuit components associated with the central "hotter" elements of the analog front end and may selectively disable the DPD circuit blocks associated with the circuit components in the cooler outer regions of the analog front end. By disabling selected DPD circuit blocks and enabling other DPD blocks, overall power consumption may be reduced. In this example, by disabling the DPD circuit blocks associated with the PAs in the outer areas of the analog front end where the PAs operate more linearly due to their cooler temperature, power savings may be realized in terms of signal processing power consumption. Moreover, the overall digital computational complexity may be reduced.

In some implementations where the antenna array architecture includes uneven heating, different sized PAs, bias power specifications, or other differences, the controller of the digital beamformer circuit may be configured to selectively deactivate the DPD circuit blocks based on temperature data and to configure selected DPD circuit blocks with appropriate DPD data (DPD coefficients) on a per element basis to linearize the operations of the PAs across the phased array. This functionality may reduce overall power consumption while enhancing overall transmission efficiency.

Embodiments of systems are described below that include a digital beamformer circuit configured to adjust one or more parameters to compensate for non-linearities in a PA in the transmission path. The digital beamformer circuit may also generate control data that may be configured to control power levels or bias levels of the PAs in the transmission path on a per element basis. An illustrative example of a digital beamformer circuit is described below with respect to FIG. 1 that provides a digital pre-distortion functionality in a design in which there is no feedback path for measurement of the PA non-linearity.

FIG. 1 depicts a block diagram of a system 100 including a digital beamformer circuit 104 configured to provide digital pre-distortion control based on temperature signals, in accordance with certain embodiments of the present disclosure. The system 100 may include an analog front end 102, which may include circuitry that may be coupled to antenna elements 110 of an antenna array. The analog front end 102 may be coupled to the digital beamformer circuit 104, which may be coupled to one or more other digital beamformer circuits 104, processing circuits, a computing device, an antenna controller, other devices, or any combination thereof through one or more input/output (I/O) interfaces 118, such as a Serializer/Deserializer (SerDes) interface.

The analog front end 102 may include a PA 108 including an input coupled to an output of the digital beamformer circuit 104 and including an output coupled to an input of a switch/diplexer 114. The switch diplexer 114 may include an input/output (I/O) interface coupled to an antenna element 110 and an output coupled to an input of an LNA 112. The LNA 112 may include an output coupled to an input of the digital beamformer circuit 104.

In the illustrated example, only two antenna elements 110(1) and 110(N) are shown. However, it should be understood that the antenna elements 110 may be part of a planar array comprised of N antenna elements.

The analog front end 102 may include one or more temperature sensors 116, which may include one or more outputs coupled to a corresponding one or more inputs of the digital beamformer circuit 104. The one or more temperature sensors 116 may generate electrical signals indicative of a temperature of a region of the analog front end 102 corresponding to one or more antenna elements 110 and the associated PAs 108.

The digital beamformer circuit 104 may include a beam forming module 120, a predistortion block 122, and a digital-to-analog converter (DAC) 124 in a transmission path of a given channel 106. In a receiving path, the digital beamformer circuit 104 may include an analog-to-digital converter (ADC) 126, a digital down converter 128, and the beam forming module 120 of the given channel. The channel 106 may include the power amplifier (PA) 108, the switch/diplexer 114, and the antenna 110 in the transmit path of the given channel 106, and may include the antenna 110, the switch/diplexer 114, and the low-noise amplifier (LNA) 112 in the receive path of the given channel 106.

The digital beamformer circuit 104 may include the one or more I/O interfaces 118, each of which may include a physical connector including a plurality of pins or electrical conductors. In some implementations, the I/O interface 118 may include circuitry configured to facilitate serializing and deserializing of data for sending and receiving data to other circuits and systems via one or more I/O communications links.

The digital beamformer circuit 104 a beam forming module 120 that may be configured to apply filter coefficients to received beam data to produce channel data for transmission via one of the antenna elements 110. The beam forming module 120 may be configured to apply filter coefficients to received channel data to produce beam data for communication via the one or more I/O interfaces 118.

The digital beamformer circuit 104 may include a pre-distortion block 122 including an input coupled to the I/O interface 118 and an output coupled to the analog front end 102 via the DAC 124. The pre-distortion block 122 may include a digital pre-distortion (DPD) module 136 that may include an input coupled to the beam forming module 120, a second input coupled to an output of a controller 130, and an output coupled to an input of a digital up converter 138. The digital up converter 138 may include an output coupled to an input of the PA 108 of the analog front end 102 via the DAC 124, which may convert the digital output of the digital up converter 138 to an analog signal for transmission via the antenna element 110. The pre-distortion block 122 includes the DPD module 136 and the digital up-converter 138 as an efficient implementation since generally, pre-distortion signal processing happens in a 2× to 4× up-sampled bandwidth compared to the content's bandwidth of the original baseband signal.

The controller 130 may include one or more I/O interfaces, pins, solder balls, or other contacts configured communicatively couple the controller 130 to other components of the digital beamformer circuit 104. The controller 130 may be coupled to the I/O interface 118 through one or more logical channels to receive data and to communicate data and optionally control instructions. The controller 130 may be coupled to the one or more temperature sensors 116 associated with the regions of the analog front end 102 to receive signals indicative of temperatures in various areas of the analog front end 102. In some implementations, the controller 130 may be communicatively coupled to the one or more temperature sensors 116 via the I/O interface 118. In other implementations, the controller 130 may be coupled to the pre-distortion block 122 of each channel 106 and may be configured to selectively activate, deactivate, or configure each pre-distortion block 122 independently of other pre-distortion blocks 122 based on one or more parameters associated with the PAs 108 of the analog front end 102. The one or more parameters may include temperature, power level or bias level, other parameters, or any combination thereof. By selectively deactivating pre-distortion circuit blocks 122, overall power consumption may be reduced. By configuring selected pre-distortion circuit blocks 122, the output signals may be adjusted on a per element basis to compensate for non-linearities introduced by the PAs 108, improving the transmission efficiency of the system 100.

The controller 130 may be coupled to or may include a memory 132, which may include a non-volatile memory device. The memory 132 may be configured to store one or more DPD tables 134, which may include DPD data including DPD coefficients. A batch of PAs 108 may be characterized during manufacturing through testing of the PAs 108 at different temperatures, different power levels or bias levels, and different operating frequencies to determine a model of the non-linearities. Based on the characterization, DPD data may be produced that may be used to counteract or otherwise cancel temperature-related and/or frequency-related non-linear distortion produced by the PAs 108. The DPD data may include a plurality of values or coefficients that may be applied to the signal to be transmitted to pre-distort the signal so that non-linear distortion in the PA 108 due to temperature variations (or other variations) can be pre-compensated to produce a final output signal that looks like it was transmitted by a linear system.

Pre-calculation of the temperature dependent digital pre-distortion (DPD) table 134 may apply generally to the PAs 108 used in the phased array. The pre-calculation may be performed during manufacturing or during product development. In an example, a batch of PAs 108 may be characterized to determine their non-linearity model. During operation, the DPD table 134 corresponding to the measured temperature in that region of the phased array is loaded into the pre-distortion blocks 122 to linearize the transmission paths.

The characterization of the PAs 108 may be performed at different temperatures, at different power levels or bias levels of the PAs, and across a range of frequencies of intended operation. If the PA 108 is intended to support a large frequency range, the characterization may be performed at multiple carrier frequencies, at different power levels or bias levels, and over a range of temperatures that cover the intended use. The resulting signal distortions are analyzed to determine pre-calculated DPD data that is applicable in general and that provides compensation for non-linear distortion across the batch of PAs 108. The DPD data may then be stored in the one or more tables 134.

In some implementations, the controller 130 may be configured to receive signals from the one or more temperature sensors that are indicative of the temperature associated with a PA 108 of the analog front end 102. In response to receiving the temperature data, the controller 130 may select DPD data from the DPD table 134 for a channel 106 associated with the PA 108 and may provide the selected DPD data to the pre-distortion block 122. In some implementations, the controller 130 may receive data indicative of the temperatures corresponding to different areas of the analog front end 102 and may selectively deactivate some of the pre-distortion circuit blocks 122 while configuring others of the pre-distortion blocks 122 with appropriate DPD data, thereby reducing overall power consumption while linearizing the outputs of selected ones of the antenna elements.

In this example, the digital beamformer circuit 104 may include a pre-distortion block 122 for each PA 108 and antenna element 110 (per-element). Accordingly, the controller 130 may select DPD data for each transmission path independent of other transmission paths so that the DPD data may be applied independently for each PA 108 in the transmission path. The per-element DPD 136 may be used to correct for non-linear operation of the PA 108 in the transmit side of the antenna element 110. The pre-distortion block 122 may operate on in-phase and quadrature (I-Q) symbols generated from a digital signal processing (DSP) step, such as a beam forming process performed by the beam forming module 120 (or by another processing circuit coupled to the digital beamformer circuit 104 via the I/O interface 118). The digital pre-distortion module 136 may multiply the input I-Q samples by a complex multiplier (selected DPD data) to pre-distort the sample. This pre-distortion has the inverse effect of the non-linear response of the PA 108, such that the final output signal looks like as if it was transmitted by a linear system. These complex multipliers are called DPD data or DPD coefficients that may be used within the pre-distortion block 122. Thus, the pre-distortion block 122 may multiply the DPD data with the I-Q sample results to produce an approximate linearization of the transmit channel.

In the illustrated example, the controller 130 may configure the pre-distortion block 122 with DPD data or DPD coefficients that are loaded from the DPD table 134 that may have been previously stored in the memory 132. The DPD table 134 may be created during the manufacturing stage and received via the control lines in the data channel (such as a SERDES data channel) received at the I/O interface 118. The controller 130 may receive the DPD table 134 from the I/O interface 118 and may store the DPD table 134 in the memory 132. In some implementations, the DPD table 134 may include a set of DPD tables that correspond to calibration data for the PAs 108 at different temperatures.

In some implementations, the controller 130 may receive parameter data corresponding to the PAs 108 of the analog front end 102 and, based on the parameter data, may selectively deactivate one or more pre-distortion circuit blocks 122, selectively configure one or more other pre-distribution circuit blocks 122 with the appropriate DPD data from one or more of the DPD tables 134, or both to provide a selected linearization performance at that temperature on a per-element basis. The controller 130 may independently configure each active pre-distribution circuit block 122 to provide a selected pre-compensation of signals to be transmitted. The controller 130 may independently deactivate one or more of the pre-distribution circuit block 122 that are determined not to be needed for linearization of the signal to be transmitted.

Further, the controller 130 may independently configure each pre-distortion controller 122 based the parameter data, which may include temperature data, power level or bias level data, or other data corresponding to each of the PAs 108 of the antenna array. The controller 130 may select first DPD data from one of the one or more DPD tables 134 based on parameter data corresponding to a first PA 108(1). The controller 130 may configure the pre-distortion block 122(1) with the first DPD data and the pre-distortion block 122(1) may multiple received I-Q signal data with the first DPD data to produce a first pre-distorted signal that may be provided to the PA 108(1) to produce an approximately linearized output signal for transmission by the antenna 110(1). The controller 130 may select second DPD data from one of the one or more DPD tables 134 based on second parameter data corresponding to a different PA 108, such as the N-th PA 108(N). The controller may configure the pre-distortion block 122(N) with the second DPD data and the pre-distortion block 122(N) may multiple received I-Q signal data with the second DPD data to produce a second pre-distorted signal that may be provided to the PA 108(N to produce an approximately linearized output signal for transmission by the antenna 110(N). The second DPD data may be selected from the same or a different DPD table 134, depending on the implementation, the architecture, the temperature characterizations, the power level or bias level, other data, or any combination thereof.

Each digital beamformer circuit 104 may support a plurality of antenna elements 110 that form an antenna array, and each beam former module 120 and pre-distortion circuit block 122 may support a region in the phased array that includes a per element circuit 111 that includes a PA 108, a switch/diplexer 114, and an LNA 112.

The digital beamformer circuit 104 may support N transmit channels. In some implementations, the N transmit channels may be supported with one or more pre-distortion tables, depending on the implementation. For example, the structure of the antenna array (or the structure of the circuitry of the analog front end 102) may be used to select between DPD tables 132 for a given temperature. Once selected, the controller 130 may configure the pre-distortion block 122 with the selected DPD data and the I-Q samples may be digitally pre-distorted by the pre-distortion module 136 after the beam forming module 120. The pre-distorted signal is processed by the digital up converter 138 to drive the PA 108.

The DPD table 134, the controller 130, and the pre-distortion blocks 122 may cooperate to provide per-element compensation for non-linearities in each of the transmit paths. By pre-compensating the signal to be transmitted using DPD data, the pre-distortion block 122 may adjust the I-Q signal to compensate for temperature-induced non-linearities in the PA 108 so that the output of the PA 108 is a linearized output signal for transmission by the antenna 110(N).

In the illustrated example of FIG. 1, the phased array may have K digital beamformer circuits 104 (integrated circuits) where each digital beam former circuit 104 supports N antenna elements 110. The total number of antenna array elements 110 is K*N. Each digital beam former circuit 104 supports N transmit channels plus N receive channels. Each transmit channel provides a transmit signal to one PA 108 that serves one antenna element 110, and each antenna element 110 provides a received signal to one LNA 112 that provides an output to one receive channel. The K digital beamformer circuits 104 may be communicatively coupled (daisy chained) with each other via the I/O interface 118 and associated communications links. The phased array formed by a plurality of the antenna elements 110 with all the digital beamformer circuits 104 may support B separate beams, and the daisy-chained digital beam former circuits 104 may provide data to and receive data from B modems.

In the illustrated example of FIG. 1, it is assumed that the digital beamformer circuit 104 performs direct digital conversion (DDC). However, the pre-distortion block 122 that uses the selected DPD data form the DPD table may be applicable to digital beamformer circuits 104 that use analog mixers and a superheterodyne architecture.

In the illustrated example, outgoing and incoming control channels may be realized within the communications links (such as SERDES communications links) used to serialize the digital beamformer circuits 104 via interconnections of the I/O interfaces 118. Each digital beamformer circuit 104 may include a plurality of pre-distortion blocks 122, each of which may include a digital pre-distortion module 136 and a digital up conversion module 138 to employ the DPD data on a per-element basis in the transmit.

The controller 130 within the digital beamformer circuit 104 may look up, coordinate, and control selection and application of the DPD data for each channel. The controller 130 may retrieve the DPD data based on a temperature associated with the PA 108 of a particular channel, and may configure the pre-distortion block 122 to utilize the selected DPD data to compensate for non-linear distortion in the PA.

In some implementations, the power levels or bias levels of the PAs 108 of the antenna array may be set individually or across all the PAs 108 in the array. During operation, the controller 130 may receive bias level or power level data from a control channel received via the I/O interface 118 and may selectively and independently activate, deactivate, or configure each pre-distortion circuit block 122 to provide a linearized output. In some implementations, in lieu of or in addition to the power level or bias level, the controller 130 may receive temperature data from the one or more sensors 116, directly or via the I/O interface 118.

In this example, the drive level for the PAs 108 may be controlled by a phased array controller and not by the digital beamformer circuit 104. However, in some implementations, the controller 130 may be configured to determine a drive level or bias point for each of the PAs 108 based on data received from the phased array controller via one or more control channels from the I/O interface 118.

In some implementations, the analog front end may include an array of circuits, each of which may correspond to an antenna element. Each circuit of the array of circuits may include a PA 108, an LNA 112, and a switch 114. In some implementations, each circuit of the array may include a second switch or diplexer to provide a feedback path. However, depending on various characteristics of the circuit architecture and on how the circuit is currently being used, different regions of the circuit may have different temperatures at any given point during operation.

In some implementations, the center PAs 108 in the circuit array may operate at higher temperatures and thus may exhibit more non-linearity while the outer or peripheral PAs 108 may operate at a lower temperature with better linearity. In some instances, the center PAs 108 may have higher bias point, while the outer PAs are biased lower. In some implementations, the sizes of circuit components may vary across the array, resulting in different heating profiles and different bias points. Examples of circuit arrays depicting different temperature regions are described below with respect to FIGS. 2-4.

Figure 2:
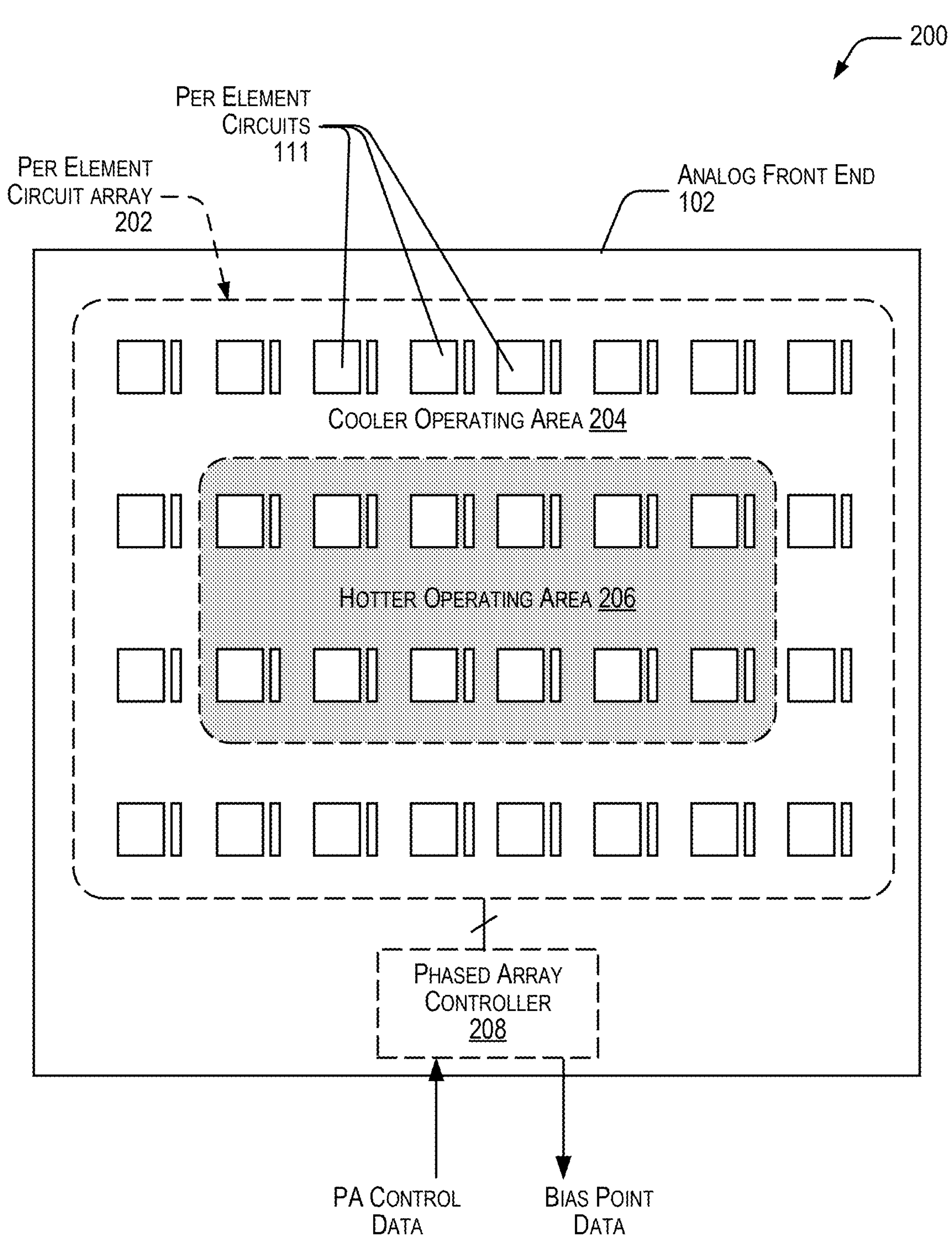
FIG. 2 depicts a block diagram of a portion of a system including an analog front end circuit including an array of per-element drive circuits having an uneven temperature distribution, in accordance with certain embodiments of the present disclosure.

FIG. 2 depicts a block diagram of a portion of a system 200 including an analog front end 102 including an array of per-element drive circuits 202 having an uneven temperature distribution, in accordance with certain embodiments of the present disclosure. In this example, the analog front end 102 may include a per element circuit array 202 comprised of per element circuits 111. Each per element circuit 111 may include a PA 108, a switch 114, an LNA 112, and optionally a second switch or diplexer. Each per element circuit 111 may include other circuitry (not shown) and may be coupled via the switch 114 to an antenna element 110 of an antenna array, such as a phased-array antenna.

In this example, each of the per element circuit 111 may be independently coupled to a phased array controller 208, which may be part of the analog front end 102 or which may be separate from and coupled to the analog front end 102. In some implementations, the phased array controller 208 may be configured to determine temperature data from the one or more temperature sensors 116. In some implementations, the phased array controller 208 may be configured to couple to each of the per element circuit 111 and may control a power level or bias point for each per element circuit 111 independently.

In some implementations, the phased array controller 208 may receive control data from the digital beamformer circuit 104. The control data may indicate a selected power level or bias point for one or more of the PAs 108. Alternatively, in some implementations, the phased array controller 208 may receive temperature data corresponding to the per element circuit array 202 and may communicate the temperature data and the power level or bias level to the digital beamformer circuit 104, which may use the data to look up the DPD data from the one or more DPD tables 134. In still other implementations, the phased array controller 208 may independently adjust the power level or bias point for each per element circuit 111 and may communicate the power level or bias point data to the digital beamformer circuit 104, which may use the data to refine the DPD data selected for each of the pre-distortion elements 122.

In the illustrated example, the per element circuit array 202 has a cooler operating area 204 and a hotter operating area 206. The PAs 108 in the hotter operating area 206 tend to generate more heat and therefore operate at higher temperatures than the PAs 108 in the cooler operating area 204. As a result, the PAs 108 in the cooler operating area 204 tend to exhibit greater linearity than those in the hotter operating area 206. The hotter operating area 206 is shown in a center portion of the per element circuit array 202, while the cooler operating area 204 is shown around the edges or periphery.

In this example, the PAs 108 are assumed to be the same size in each of the per element circuits 111 within the per element circuit array 202. However, in some implementations, the PAs 108 may vary in size such that some areas of the per element circuit array 202 have larger PAs 108 while other areas have smaller PAs 108, which may have different temperature characteristics, different bias points, and so on. In this example, the per element control provided by both the digital beamformer circuit 104 and the phased array controller 208 may cooperate to reduce power consumption, reducing thermal effects, and improve overall transmission efficiency.

Figure 3:
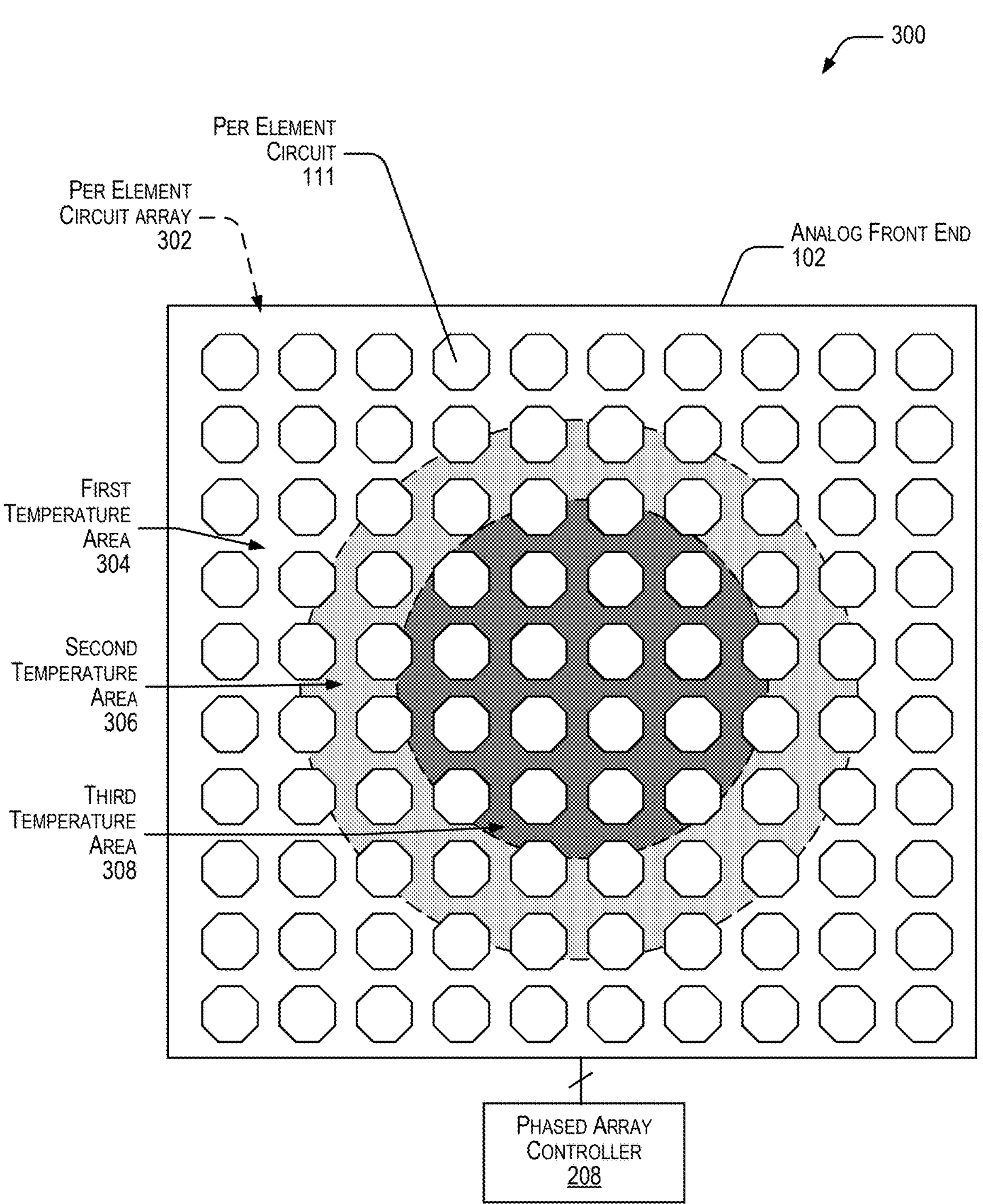
FIG. 3 depicts a block diagram of a portion of a system including an analog front end circuit including an array of per-element drive circuits having an uneven temperature distribution, in accordance with certain embodiments of the present disclosure.

FIG. 3 depicts a block diagram of a portion of a system 300 including an analog front end circuit 102 including an array 302 of per-element drive circuits 111 having an uneven temperature distribution, in accordance with certain embodiments of the present disclosure. In this example, the per element circuit array 302 may have a different arrangement of circuit elements. Further, within the array 302, the PAs 108 of the per-element circuits 111 may have different sizes and different bias points, which may contribute to uneven heating.

In some implementations, the per element circuit array 302 may include a first temperature area 304, a second temperature area 306, and a third temperature area 308. The third temperature area 308 may be hotter than the second temperature area 306, which may be hotter than the first temperature area 304.

As previously discussed, the digital beamformer circuit 104 may automatically determine DPD data based on the temperature of various areas of the analog front end 102 and may configure the pre-distortion circuit block 122 to pre-compensate a signal to be transmitted so that the non-linear distortion introduced by the PA 108 is negated. In some implementations, the digital beamformer circuit 104 may receive temperature and power level or bias point data from the analog front end 102 (from sensors or from the phased array controller 208) and may determine the DPD data based on the temperature and power level or bias point data. In some implementations, one or more of the digital beamformer circuit 104 or the phased array controller 208 may control the power level or bias point of each PA 108 within the per element circuit array 302. In some implementations, the controller 130 of the digital beamformer circuit 104 may communicate PA control data to the phased array controller 208 via the I/O interface 118. In other implementations, the phased array controller 208 may receive data from and provide data to the controller 130 and may control the power levels or the bias points of each of the PAs 108 within the per element circuit array 302.

While the examples of FIGS. 2 and 3 depicted a thermal distribution wherein a hotter portion of the circuit array is in the center of the circuit and the cooler portions were near the periphery, other thermal distributions are also possible. An example of a circuit that includes an irregular thermal distribution is described below with respect to FIG. 4.

Figure 4:
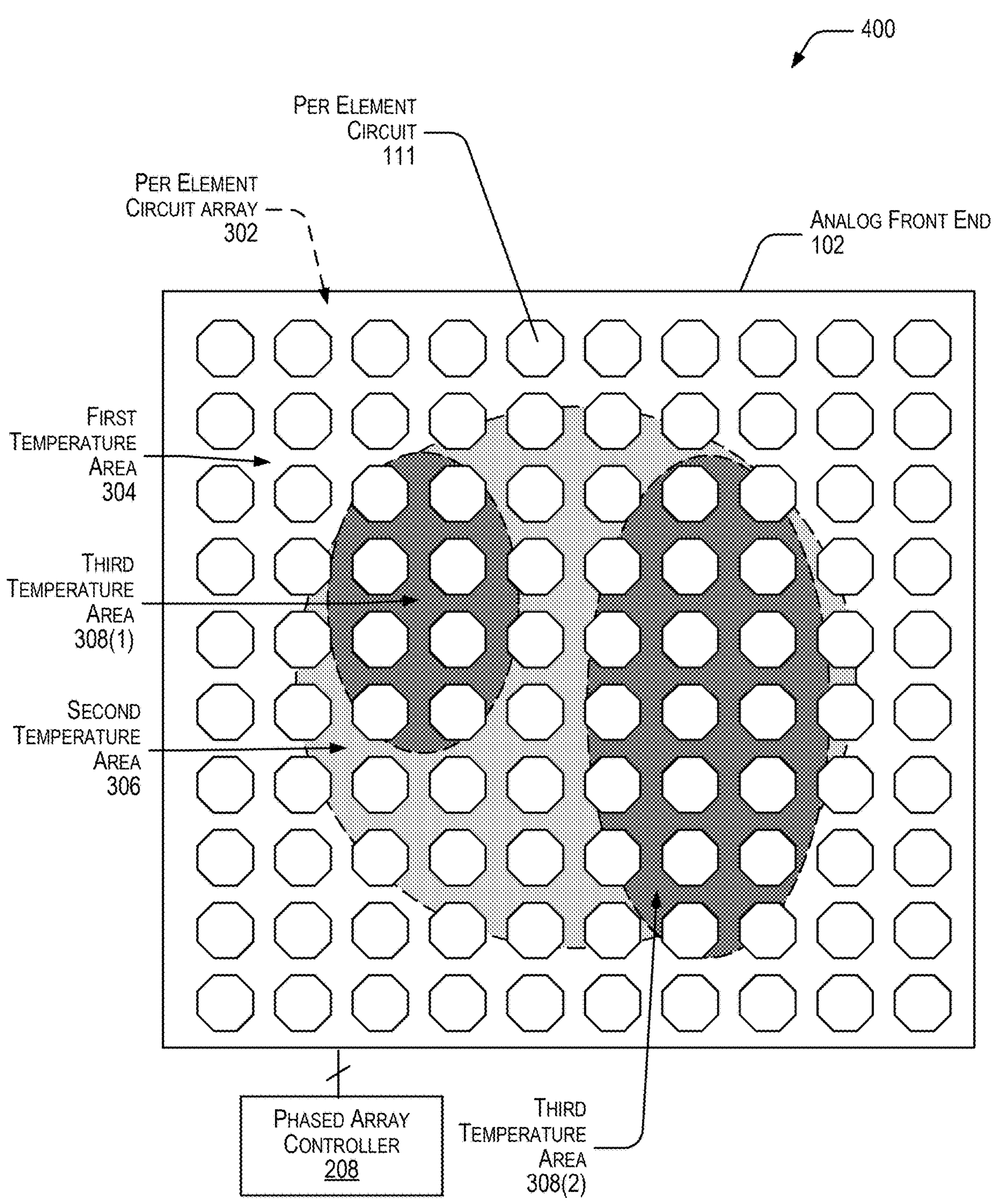
FIG. 4 depicts a block diagram of a portion of a system including an analog front end circuit including an array of per-element drive circuits having an uneven temperature distribution, in accordance with certain embodiments of the present disclosure.

FIG. 4 depicts a block diagram of a portion of a system 400 including an analog front end 102 including an array of per-element drive circuits 302 having an uneven temperature distribution, in accordance with certain embodiments of the present disclosure. The illustrated example includes a first temperature area 304, a second temperature area 306, and a pair of third temperature areas 308(1) and 308(2). In this example, the per element circuit array 302 may include PAs 108 having different sizes at different physical locations within the array 302.

During operation, the array 302 may heat unevenly. The temperature distribution may be determined by the controller 130 of the digital beamformer circuit 104, which may selectively control one or more of the pre-distortion circuit blocks 122 to pre-compensate the signal for transmission. In some implementations, the controller 130 may send PA control data to the phased array controller 208, which may independently control each of the PAs 108.

As discussed above, the controller 130 may be configured to selectively activate, deactivate, or configure each pre-distortion block 122 based on one or more parameters associated with the PAs 108 of the analog front end 102. The parameters may include temperature data, power level or bias point data, or other data, such as calibration data. In some implementations, one or more of the controller 130 or the phased array controller 208 may determine and control power levels or bias points for each of the PAs 108 in the array. One possible example of a digital beamformer circuit 104 is described below with respect to FIG. 5 that uses feedback from the PAs 108 of the analog front end 102 to determine non-linearity and to provide pre-distortion compensation and optionally power level or bias point data.

In some implementations, the controller 130 may use the temperature data, the power level or bias point data, and the calibration data to determine the DPD data. An example is described below with respect to FIG. 5.

Figure 5:
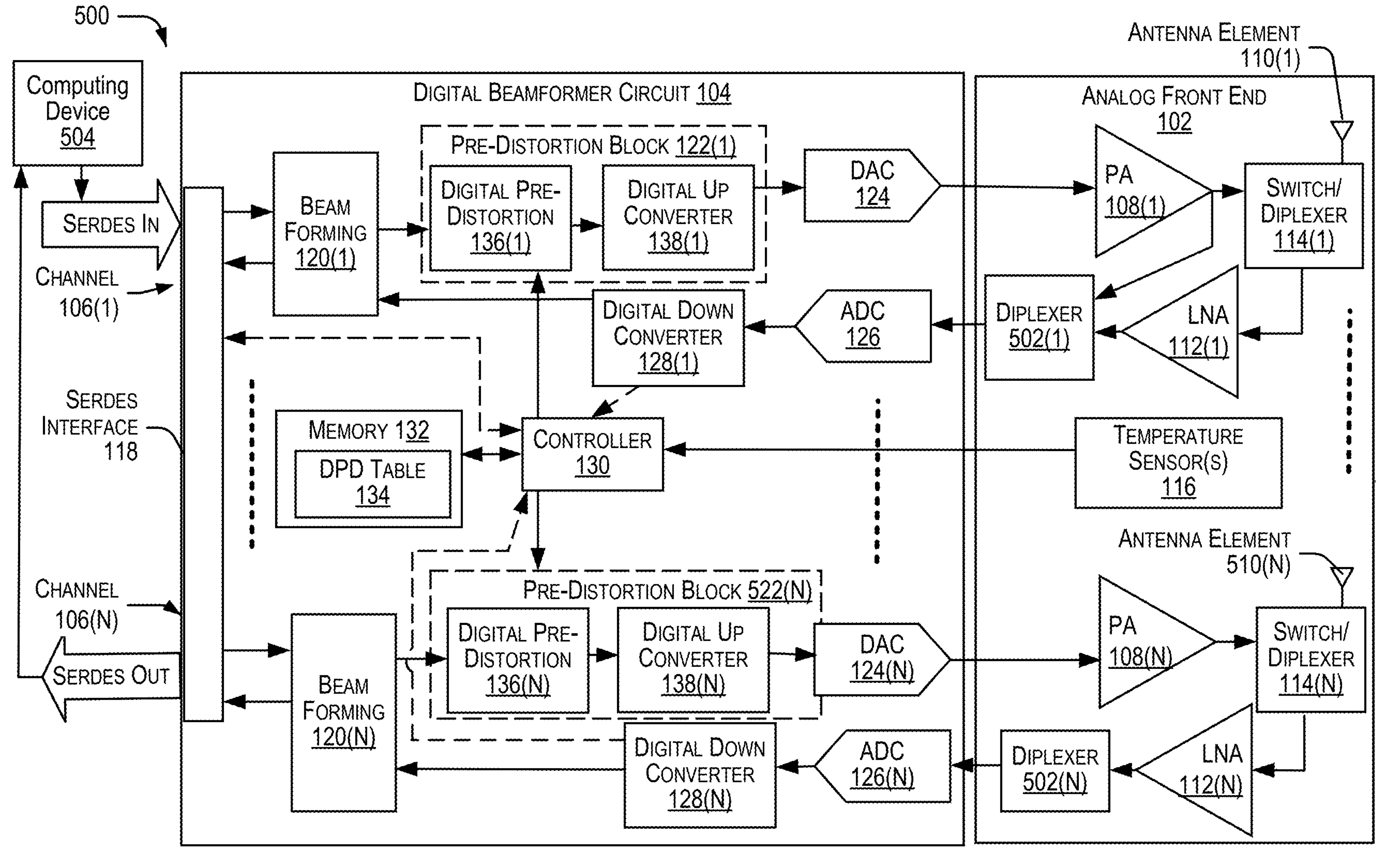
FIG. 5 depicts a block diagram of a system including a digital beamformer circuit configured to provide digital pre-distortion control based on temperature signals and power amplifier feedback signals, in accordance with certain embodiments of the present disclosure.

FIG. 5 depicts a block diagram of a system 500 including a digital beamformer circuit 104 configured to provide digital pre-distortion control based on one or more of temperature signals or feedback signals from the PAs 108, in accordance with certain embodiments of the present disclosure. In this example, the system 500 may include all of the elements of the system 100 of FIG. 1. In addition, in this example, the output of each PA 108 is coupled to the switch/diplexer 114, which is coupled to antenna. The output of each PA 108 is also fed back to the digital beamformer circuit 104.

The analog front end 102 may include a diplexer 502 coupled between the LNA 112 and the ADC 126 of the digital beamformer circuit 104. The diplexer 502 may include a first input coupled to the output of the PA 108, a second input coupled to the output of the LNA 112, and an output coupled to the ADC 126. The diplexer 502 may allow the analog front end 102 to switch between an operating mode and a calibration mode.

In some implementations, the controller 130 may initiate a mode switch by sending a signal via the I/O interface 118 to a processing system (computing device 504 or the phased array controller 208) that may be configured to provide signals to control the switch diplexer 114 and the diplexer 502. Alternatively, the switch/diplexer 114 and the diplexer 502 may be controlled periodically to provide the feedback path for calibration, and the controller 130 may receive a notification of the calibration operation.

In the operating mode, signals may be communicated to the analog front end 102 by the digital beamformer circuit 104 for transmission via the antenna element 110 and may be received from the antenna element 110 by the digital beamformer circuit 104 via the LNA 112. In the calibration mode, the digital beamformer circuit 104 may send a calibration signal to the PA 108 of the analog front end 102, and the output of the PA 108 may be provided back to the digital beamformer circuit 104 via the diplexer 502 and the ADC 126.

The controller 130 may receive a calibration signal from the analog front end 102 via one or more logical communication paths, and the controller 130 may compare the feedback signal to the original signal that was sent from the beam forming module 120. The controller 130 may select the DPD data from one of the one or more tables 134 based on one or more of the temperature data from one of the temperature sensors 116 or the feedback data from the PA 108. The selected DPD data may be selected to compensate for non-linear distortion of the PA 108. The controller 130 may provide the DPD data to the pre-distortion block 122 to pre-compensate a signal from the beam forming module 120 for the non-linear distortion of the PA 108, so that the output of the PA 108 is a linearized output signal.

In this example, the controller 130 may use look-up operations to retrieve DPD data (DPD coefficients) from the DPD tables 134 in response to the temperature data, the calibration data, the power level or bias point data, or any combination thereof. The controller 130 may utilize a measurement-based feedback signal from the output of each PA 108 that is returned by the diplexer 502 via the receive channel of the digital beamformer circuit 104. The controller 130 (or a computing device 504) may compare the feedback signal to the calibration signal that was sent to the PA 108 to determine the output response (nonlinear response). In some implementations, the controller 130 may determine the DPD data based on the feedback signal. The controller 130 may selectively turn on or off one or more of the pre-distortion blocks 122 and may configure some or all of the pre-distortion blocks 122 with selected DPD data to pre-compensate the signal to be transmitted so that the non-linearities introduced by the PAs 108 do not distort the signal.

In other implementations, the feedback signal may be communicated to an external processor (computing device 504) via the I/O interface 118, which may determine (compute) the DPD coefficients and send them to the controller 130 via the I/O interface 118 to activate, deactivate, or configure each of the pre-distortion blocks 122 independently. The computing device 504 may include a general-purpose processor that may be configured to calculate DPD coefficients per element based on the feedback signals from each transmit path.

In this architecture, a coupled feedback path may exist between the PA 108 and the ADC 126 via the diplexer 502 (or via a diplexer/switch 302 in FIG. 3). During periodic measurement and calibration intervals, the data link may be switched off, by disabling the switch/diplexer 114 and by toggling the diplexer 502 to provide the output of the PA 108 as feedback to the ADC 126. The LNA 112 in the receive path may also be turned off or disabled.

In some implementations, during calibration, the DAC 124 in the transmission path may output a known calibration sequence of I-Q samples that are not pre-distorted. The known calibration sequence may be provided as an input to the PA 108, which may produce an output signal that may be fed back to the ADC 126. The output signal from the PA 108 may include non-linear distortion, and the feedback signal or samples thereof may be processed by the controller 130 or sent via the I/O interface 118 to a general-purpose computer (computing device 504). The controller 130 or the computing device 504 may determine the DPD data (the pre-distortion coefficients) for each transmit channel and may provide the DPD data to the corresponding pre-distortion blocks 122 via the I/O interface 118 or control lines from the controller 130. After the measurement calibration interval, the phased array may resume normal communications data link operations.

In one instantiation of the feedback-based pre-distortion coefficient calculation, for each antenna element, the coupled feedback path the output of each PA 108 and the receiver output of the LNA 112 from the receive path may be routed by the diplexer 502 to the digital beamformer circuit 104. During normal operation, the LNA 112 is enabled, and the diplexer 502 couples the receive channel path and not the feedback path to the digital beamformer circuit 104. In this architecture, because of the diplexer 502, the transmit and receive links cannot be operated simultaneously, and time division duplexing may be used between transmit and receive operations.

In alternative examples, the diplexer 502 may be replaced with a switch, when may allow the transmit and receive links to operate simultaneously. One example of such an implementation is described below with respect to FIG. 6.

Figure 6:
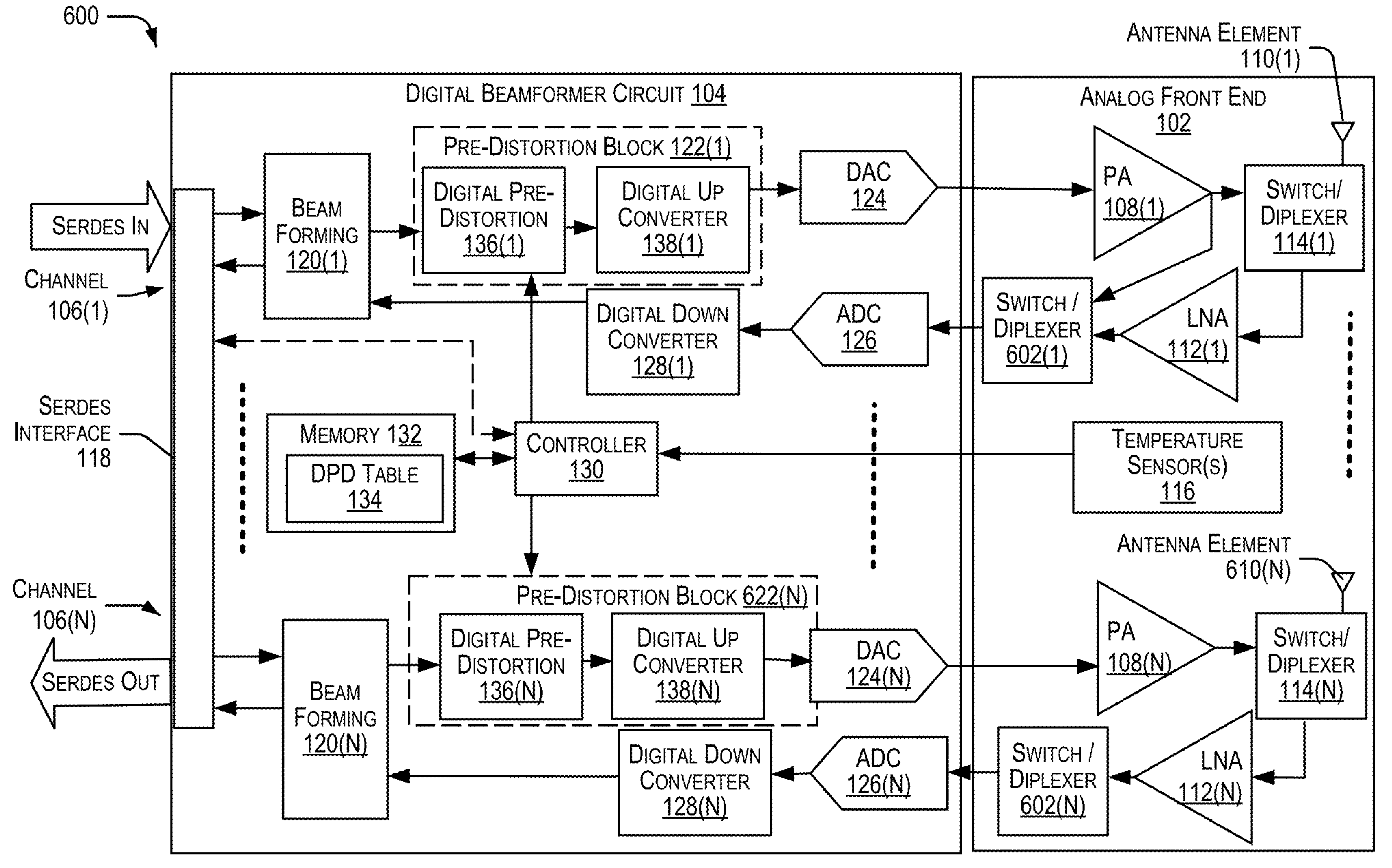
FIG. 6 depicts a block diagram of a system including a digital beamformer circuit configured to provide digital pre-distortion control based on temperature signals and power amplifier feedback signals, in accordance with certain embodiments of the present disclosure.

FIG. 6 depicts a block diagram of a system 600 including a digital beamformer circuit 104 configured to provide digital pre-distortion control based on temperature signals and PA feedback signals, in accordance with certain embodiments of the present disclosure. The system 600 includes all the elements of the system 500 of FIG. 5, except that the diplexer 502 is replaced with a switch/diplexer 602 configured to selectively couple one of the feedback signal from the PA 108 or the received signal from the LNA 112 to the digital beamformer circuit 104.

As previously discussed, the digital beamformer circuit 104 may be configured to use the temperature data, the power level or bias point data, the feedback signal data, or any combination thereof to determine DPD data to configure the pre-distortion block to compensate for non-linearities in the PA 108. By replacing the diplexer 502 with the switch/diplexer 602, the transmit and receive channels may be used concurrently.

In the examples above, the DPD table 134, temperature data, power level or bias point data, and calibration data may be provided to the controller 130, which may use one or more of the parameters associated with the PA 108 to select DPD data from the DPD table 134 and to configure the pre-distortion block 122. The pre-distortion block 122 may be configured to pre-distort a signal for transmission to pre-compensate for the non-linear distortion introduced by the PA 108. In some instances, the controller 130 may determine that pre-calibration is not needed for one or more of the PAs 108 based on the temperature data, the power level or bias point data, and the controller 130 may deactivate those pre-distortion circuit blocks 108, reducing overall power consumption.

In the above examples, the controller 130 may be configured to receive PA drive level data from the control channels of the communication links via the I/O interface 118 and may selectively activate, deactivate, or configure each pre-distortion circuit block 122 based on the PA drive level data. In some implementations, in addition to controlling the pre-distortion circuit blocks 122, the controller 122 may be configured to control the power level or bias point of each of the PAs 108, providing enhanced power efficiency and improved signal transmission An example of a system is described below with respect to FIG. 7 that includes a digital beamformer circuit 104 with a controller 130 that may configure a pre-distortion block 122 as a function of the PA drive signals and that may send control signals to control the power level or bias point of each PA 108 of the analog front end.

Figure 7:
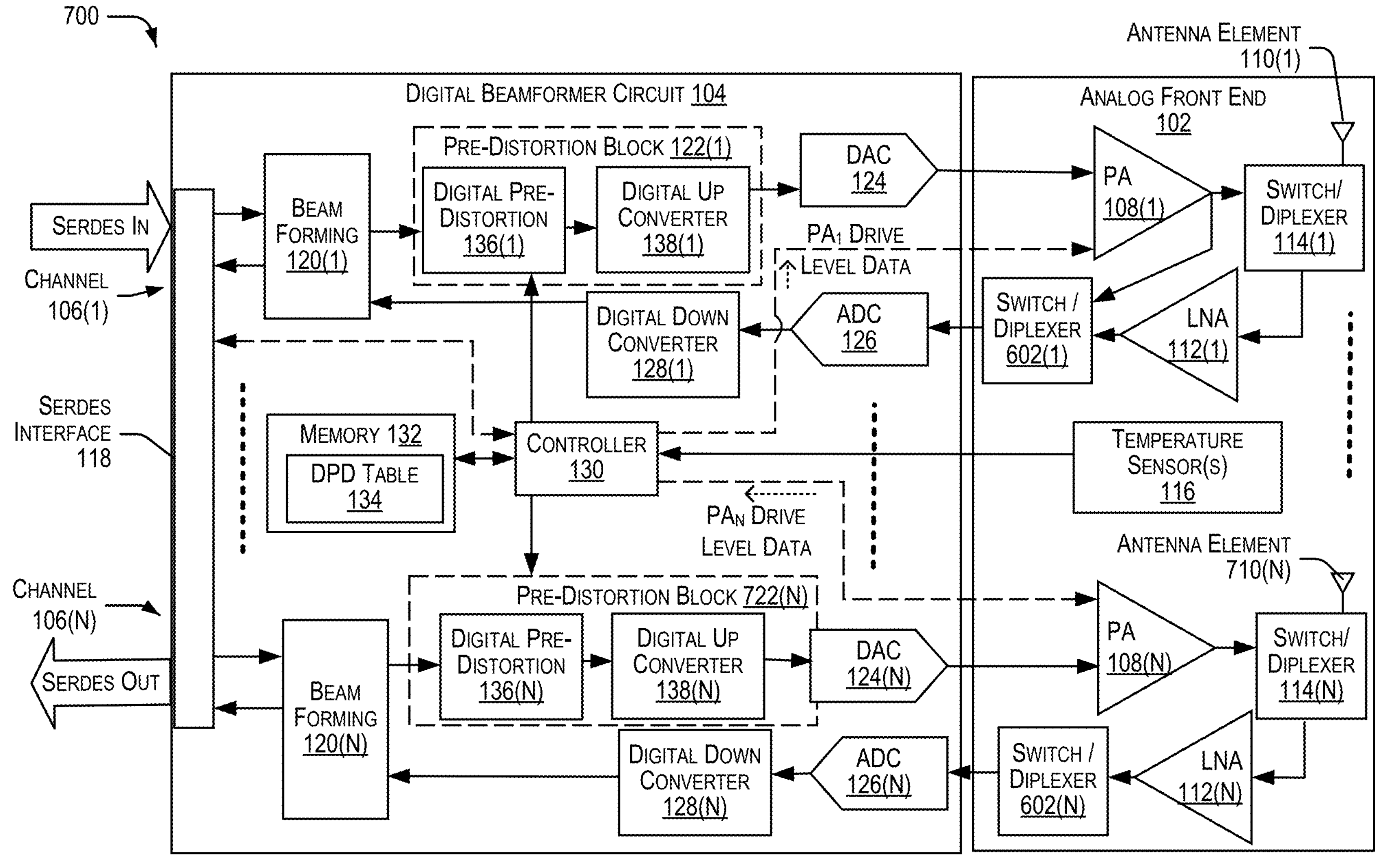
FIG. 7 depicts a block diagram of a system including a digital beamformer circuit configured to provide digital pre-distortion control based on the power amplifier drive signal, in accordance with certain embodiments of the present disclosure.

FIG. 7 depicts a block diagram of a system 700 including a digital beamformer circuit 104 configured to provide digital pre-distortion control based on the power amplifier drive signal, in accordance with certain embodiments of the present disclosure. In this example, the system 700 may include all the elements of the system 600 of FIG. 6. Connections between the PAs 108 and the controller 130 are shown in phantom to represent the signals provided by the controller 130 to independently control the power level or bias point of each of the PAs 108.

In some implementations, the controller 130 may determine temperature data from the one or more temperature sensors 116 and may generate signals to selectively activate, deactivate, or configure each of the pre-distortion circuit blocks 122 and to selectively control the power level or bias point of each of the Pas. The power level or bias point control data may be sent by the controller 130 to the analog front end 102 via the I/O interface 118 to the phased array controller 208 (or another circuit) that is external to the digital beamformer circuit 104 and that communicates the power level or bias point signals to the PAs 108.

In some implementations, the controller 130 may have a physical connection to each of the PAs 108 through electrical connections provided on the digital beamformer circuit 104 and on the analog front end 102 and may provide power level or bias point control signals to each of the PAs 108 directly. Other implementations are also possible.

In this example, the DPD table 134 may be determined based on temperature and based on PA drive level information. During manufacturing and development, in addition to the temperature-based characterization, the PAs 108 may be characterized by applying different bias levels to determine bias-level distortion that applies generally to the PAs 108 in the phased array. The pre-distortion tables (DPD tables 134) include DPD data that may be re-calculated based on the power level of drive signals of the PAs 108 in addition to one or more of temperature, frequency, or other parameters. The DPD data may include thresholds for determining when to activate or deactivate a pre-distortion circuit block 122 based on one or more parameters of the PAs 108, such as the calibration data, the temperature data, the PA power level or bias point data, or any combination thereof. The DPD data may include coefficients for configuring each active pre-distortion circuit block 122 to pre-compensate for non-linearities that will be introduced by the PA 108 in the transmission path. The DPD data may also include power level and bias point settings that may be used to configure the PAs 108. The controller 130 may retrieve the DPD data based on the temperature data or calibration data and may control the pre-distortion blocks 122 and the PAs 108 independently.

The bias-level for each PA 108 may be set individually or across all the PAs 108 in the phased array, for example, by the antenna array controller 208 in response to PA control settings provided by the controller 130. Further, the controller 130 may deactivate some of the pre-distortion blocks 122 because the temperature data indicates that one or more of the PAs 108 are operating at a temperature range in which they should provide a linear output response without the need for pre-compensation.

In some implementations, the digital beamformer circuit 104 may include control lines to sense the bias point/drive level of each PA 108 in each channel. The controller 130 may then determine the drive line power level provided to the PA 108 and the temperature of the area of the analog front end 102 and may select the DPD data based on the temperature, the drive line power level, or a combination thereof.

In other implementations, the drive level for the PAs 108 is controlled by a phased array controller 108 that may be separate from the digital beamformer circuit 104 and that may communicate with the digital beamformer circuit 104 via the I/O interface 118. The controller 130 may determine power level or bias point data for each of the PAs 108 based on the temperature data from the temperature sensors 118 and may send power level or bias point control data to the phased array controller 108 via control channels received at the I/O interface 118. In response to receiving the power level data, the phased array controller 208 may apply the selected power levels or bias points to each of the PAs 108.

Several novel architectures for power-efficient digital beamformed phased arrays are enabled by the above-described technology. First, the above-described technology enables digital pre-distortion on a per antenna element basis. At a system level, DPD functionality can be activated or deactivated (turned on or off) for any antenna element 110 or group of antenna elements 110 in the array. In some implementations, the digital beamformer circuit 104 may also control the power level or bias point of each PA 108 individually. The combination of independent power level or bias point control of the PAs 108 and the selective activation of the pre-distortion circuit blocks 122 may enable power-efficient phased arrays.

In one implementation, all PAs 108 in the array may be the same size but may be biased differently. Typically, the center PAs 108 in a phased array may operate at a higher temperature and thus exhibit more non-linearity while the outer element PAs 108 of the array may operate at a lower temperature and may exhibit greater linearity. In some implementations of the present disclosure, the center PAs 108 may have a higher power level or bias point, while the outer element PAs 108 may have a lower power level or bias point, reducing overall power consumption in the phased array. Since all the PAs 108 may be operating near saturation, the controller 130 may enable the pre-distortion circuit block 122 for all the antenna elements 110. The controller 130 may select the DPD data from the DPD tables 134 for each region of the phased array based on temperature and the power level or bias point for each PA 108. In some implementations, the controller 130 may verify or adjust the selected DPD data based on calibration measurement data.

Regardless of the specific implementation, the controller 130 of the digital beamformer 104 may be configured to selectively activate, deactivate, or configure each pre-distortion circuit block 122 independently. Within a set of digital beamformer circuits 104 on a phased array panel, the digital pre-distortion circuit blocks 122 may be deactivated for the entire digital beamformer circuit 104 on a circuit-by-circuit basis. Additionally, digital pre-distortion circuit blocks 122 may be activated or deactivated on a per antenna element basis. Thus, regions in the array circuit may have pre-distortion enabled or disabled by toggling the pre-distortion circuit blocks 122 on all the channels of a digital beamformer circuit 104 or on selected channels. By toggling the pre-distortion circuit block 122 on individual channels of the array, the pre-distortion circuit blocks 122 may be enabled or disable for interspersed antenna elements 110 of the array.

In some implementations, the pre-distortion circuit block 122 may be enabled for antenna elements 110 positioned on the inner side of the array because the temperature of the array tends to be higher in the middle of the array and those PAs 108 exhibit more non-linearity. Antenna elements 110 in the outer regions of the array may have no pre-distortion (the pre-distortion circuit block 122 is turned off) because the associated PAs 108 tend to be cooler and may be producing a linear output.

In another implementation, the digital beamformer circuit 104 may disable the pre-distortion circuit blocks 122 associated with antenna elements 110 in the center of the array. In this example, larger PAs 108 with higher power levels or bias points may serve the antenna elements 110 in the middle of the array while the array elements 110 in the outer regions of the array are provided with smaller PAs 108 with lower power levels or bias points. The pre-distortion circuit blocks 122 associated with the smaller PAs 108 may be enabled. Alternately, the pre-distortion blocks 122 may be enabled for both regions of the array with the pre-distortion blocks 122 configured with selected DPD data that is appropriate for the respective size of the PA 108. Each of these controllable configurations may enable enhanced performance with reduced overall power consumption.

Figure 8:
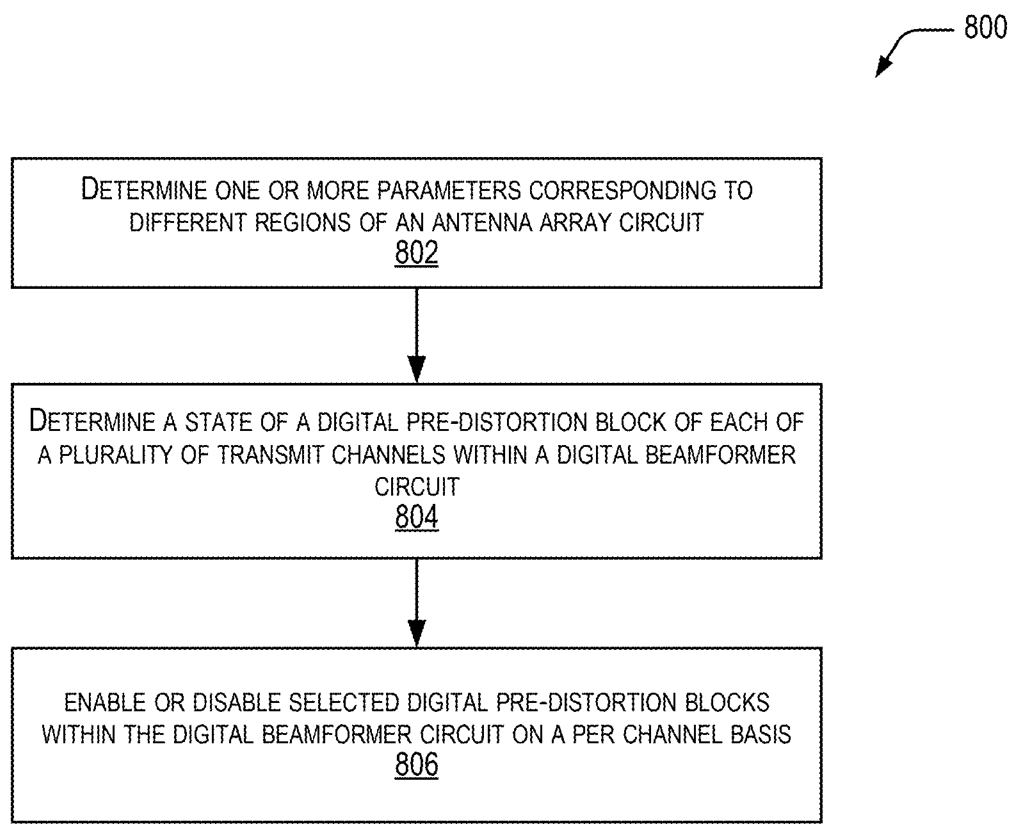
FIG. 8 depicts a flow diagram of a method of selectively activating DPD functionality based on one or more parameters associated with an analog front end, in accordance with certain embodiments of the present disclosure.

FIG. 8 depicts a flow diagram of a method 800 of selectively activating DPD functionality based on one or more parameters associated with an analog front end, in accordance with certain embodiments of the present disclosure. As previously discussed, the DPD functionality may be disabled for selected channels individually, for groups of channels, or for an entire digital beamforming circuit 104. In this example, the digital beamformer circuit 104 may selectively disable or enable the digital pre-distortion functionality on per element or per channel basis.

At 802, the method 800 may include determining one or more parameters corresponding to different regions of an antenna array circuit. The one or more parameters may include temperature data, power level or bias point data, calibration data, or any combination thereof. In some implementations, the one or more parameters may be determined by receiving temperature data from one or more temperature sensors, receiving PA power level or bias point data from a phased array controller 208; by receiving calibration data from a feedback loop or from an external computing device 504, or any combination thereof. In other implementations, the one or more parameters may be determined by receiving temperature data from one or more temperature sensors, by determining the current power level or bias point of each of the PAs 108 (which are controlled by the controller 130), by determining calibration data from a feedback loop or receiving it from an external computing device 504, or any combination thereof.

At 804, the method 800 may include determining a state of a digital pre-distortion block of each of a plurality of transmit channels within a digital beamformer circuit 104. The controller 130 may determine the on-off state of each digital pre-distortion circuit block 122 of the digital beamformer circuit 104.

At 806, the method 800 may include enabling or disabling selected digital pre-distortion blocks 122 within the digital beamformer circuit 104 on a per channel basis. The controller 130 may selectively enable or disable one or more of the pre-distortion circuit blocks 122 based on the one or more parameters and the state of the DPD block. In an example, temperature data, calibration data, PA power level or bias point data, or any combination thereof may indicate that the PA 108 of a particular channel is operating without introducing non-linearities, and the controller 130 may be configured to disable the associated pre-distortion circuit block 122. Similarly, the controller 130 may determine that the one or more parameters are indicative of a PA 108 that may introduce non-linearities and the controller 130 may activate the associated pre-distortion circuit block 122 and configure the activated pre-distortion circuit block 122 with selected DPD data to pre-compensate the signal to cancel or eliminate the non-linearities.

By deactivating selected pre-distortion blocks 122, the overall power consumption of the digital beamformer circuit 104 may be reduced. Additionally, by selectively pre-compensating at least some of the signals to be transmitted, the linearity of the signal transmitted by each of the antenna elements 110 may be improved.

Figure 9:
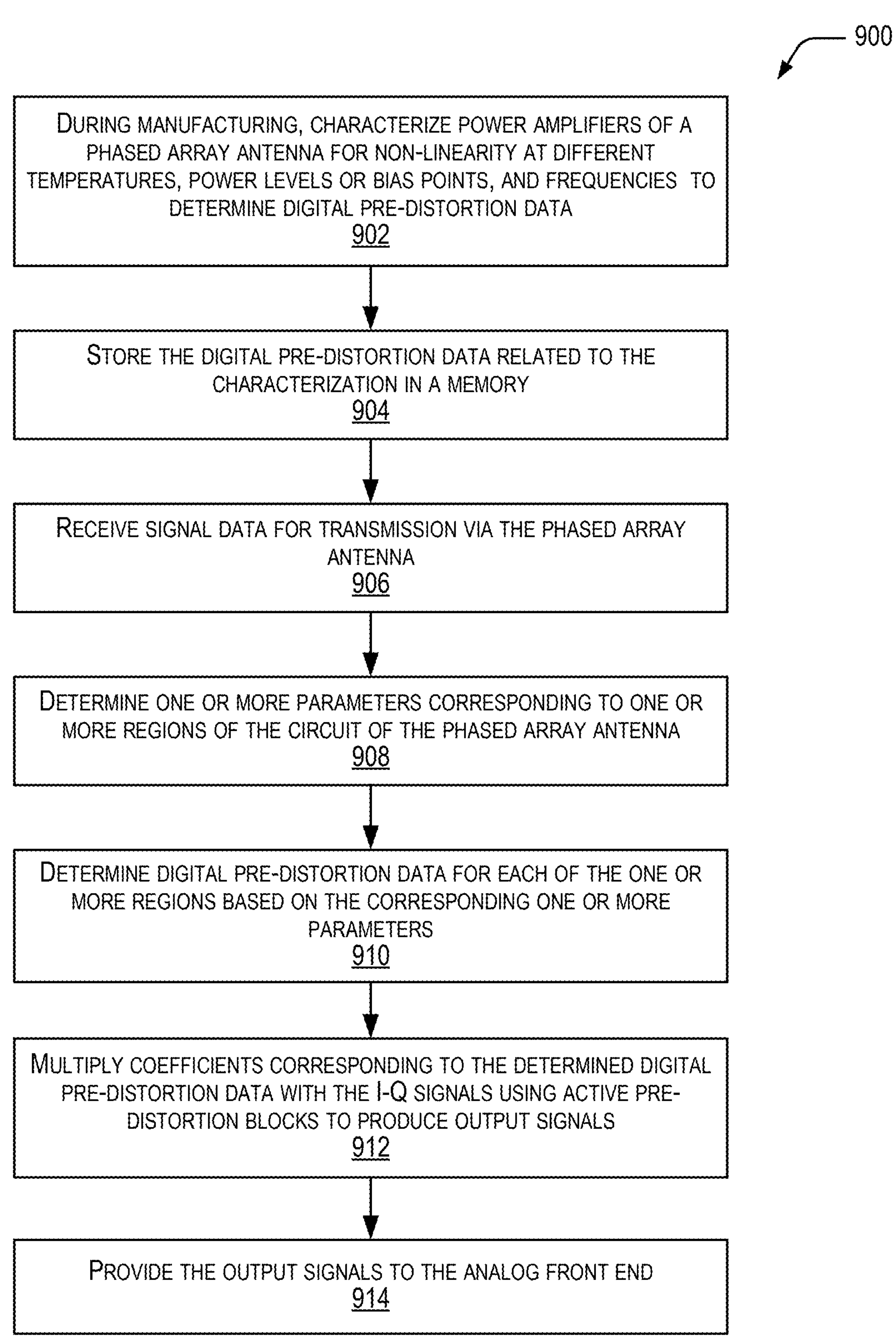
FIG. 9 depicts a flow diagram of a method of selectively controlling power consumption based on one or more parameters associated with an analog front end, in accordance with certain embodiments of the present disclosure.

FIG. 9 depicts a flow diagram of a method 900 of selectively controlling power consumption based on one or more parameters associated with an analog front end, in accordance with certain embodiments of the present disclosure. At 902, the method 900 may include characterizing power amplifiers of a phased array antenna for non-linearity at different temperatures, power levels or bias points, and frequencies to determine digital pre-distortion data, during manufacturing or development. In some implementations, a batch of PAs 108 may be characterized by performing test operations at different temperatures, different bias levels, and at one or more frequencies within an expected operating range to determine non-linear output characteristics of the batch of PAs 108. The non-linear output characteristics may be processed to determine DPD data that represents pre-compensation values that may be multiplied with the signal to be transmitted to produce a pre-compensated signal that eliminates or negates the non-linearities introduced by the PA 108 at each combination of temperature, power level or bias point, and frequency.

At 904, the method 900 may include storing the DPD data related to the characterization in the memory 132. In particular, the characterization data determined from the PAs 108 may be used to determine the DPD data or coefficients configured to pre-distort a signal to compensate for non-linearities in the output of the PA 108 at various temperatures, power levels or bias points, and frequencies. The DPD data may also include power level or bias point settings for configuring the power level or bias points of the PAs 108. The DPD data may be stored in a DPD table 134 in the memory 132 and may subsequently be used to pre-distort signals to be transmitted based on a determined temperature of the region of the analog front end 102 that includes the PA 108.

At 906, the method 900 may include receiving a signal for transmission via the phased array antenna 906. The signal may include I-Q signal data received from a processing device via a I/O interface 118 or other serial interface for each antenna element 110. The I-Q signal data may be provided to the beam former modules 120, which may produce output signals for transmission by the antenna elements 110.

At 908, the method 900 may include determining one or more parameters corresponding to one or more regions of the circuit of the phased array antenna. In some implementations, the one or more parameters may include temperature data received from one or more sensors 116 of the analog front end 102, either directly or via a control channel of a communications link. The one or more parameters may include power levels or bias levels of the PAs 108, calibration data from a feedback loop, other data, or any combination thereof.

At 910, the method 900 may include determining digital pre-distortion data (DPD data) for each of the one or more regions based on the corresponding temperature data. The DPD data may be determined on a per-element basis. In some implementations, based on the DPD data, the controller 130 may disable some or all of the pre-distortion circuit blocks 122. In some implementations, the DPD data may cause the controller 130 to enable and configure one or more of the pre-distortion blocks. Each of the active pre-distortion blocks 122 may be configured independently. Additionally, the DPD data may cause the controller 130 to send signals to individually control the power level or bias level of each of the PAs 108.

At 912, the method 900 may include multiplying coefficients corresponding to the determined DPD data with the I-Q signals using active pre-distortion circuit blocks 122 to produce output signals. The coefficients of the DPD data may be configured to pre-compensate the I-Q signals to compensate for non-linearities introduced by the PAs 108 on a per element basis. Signals may be passed through the deactivated pre-distortion circuit blocks 122 without multiplication.

At 914, the method 900 may provide the output signals to the analog front end. The pre-compensated output signals may be provided to the inputs of the PAs 108, which may introduce non-linearities that may be canceled by the pre-compensated output signals, producing a linearized output signal.

In the illustrative example of FIG. 9, the pre-compensation may be selectively performed based on one or more of the temperature, power level or bias point, or calibration data associated with a region of the antenna array on a per element basis. The digital beamformer circuit 104 may utilize the DPD data to selectively pre-compensate the output signal and control the power level or bias point of the PA 108 on a per-element basis. The controller 130 of the digital beamformer circuit 104 may either lookup DPD data in a DPD table 134 stored in memory 132 to retrieve pre-distortion coefficients, calculate the DPD data on the fly, or receive the DPD data from another source (such as a phased array controller 208 or a computing device 504). The controller 104 may selectively activate or deactivate each pre-distribution block 122 and may configure each activated pre-distortion block 122 to pre-compensate selected ones of the output signals to linearize the transmitted signals in spite of non-linearities introduced by the associated PAs 108. Additionally, the controller 104 may send signals to set the power level or bias point of each of the PAs 108 in the array.

In conjunction with the systems, methods, and devices described above with respect to FIGS. 1-9, a digital beamformer circuit 104 is disclosed that includes a plurality of pre-distortion blocks 122 and a controller 130. The controller 130 may be configured to determine one or more parameters of an analog front end 102 and to select DPD data from a DPD table 134 based on the one or more parameters. The selected DPD data may cause the controller 130 to selectively deactivate or activate and configure each pre-distortion block 122 on a per antenna element basis and may be configured to selectively send signals to control the power level or bias point of each PA 108 of the analog front end circuit 108. The one or more parameters may include temperature data, power level or bias point data, calibration data, or any combination thereof.

Selective activation of the pre-distortion blocks 122 of the digital beamformer circuit 104 may reduce overall power consumption. Selective control of the power level or bias points of the PAs 108 may reduce overall power consumption of the antenna array. Configuring each of the active pre-distortion blocks 122 may cooperate with the PA power level or bias point control to facilitate power-efficient linearized signal transmission.

Although the present invention has been described with reference to preferred embodiments, workers skilled in the art will recognize that changes may be made in form and detail without departing from the scope of the invention.

What is claimed is:

1. A system comprising:
- a phased antenna array including a phased array controller and one or more digital beam former (DBF) circuits, each DBF circuit is coupled to an analog front end that is coupled to N antenna elements of the phased antenna array, each digital beamformer circuit comprising:
  - an input/output (I/O) interface configured to couple to at least one second device;
  - a plurality of digital pre-distortion (DPD) circuit blocks, each DPD circuit block corresponding to a transmission path that includes one of the N antenna elements; and
  - a controller configured to:
    - determine one or more parameters associated with the analog front end;
    - selectively deactivate one or more of the plurality of DPD circuit blocks corresponding to a first region;
    - selectively activate one or more of the plurality of DPD circuit blocks corresponding to a second region;
    - determine DPD data from one or more DPD tables for each activated DPD circuit block based on the one or more parameters; and
    - independently configure each activated DPD circuit block with the determined DPD data to pre-compensate a signal on a per antenna element basis to negate non-linearities introduced by a power amplifier in the transmission path; and
- a control channel implemented from the phased array controller via the I/O interface to the one or more DBF circuits to perform control and configuration operations.

2. The system of claim 1, wherein each activated DPD circuit block is configured to multiply a signal to be transmitted by the determined DPD data to produce the pre-compensated signal.

3. The system of claim 1, wherein the controller is further configured to send one or more signals to selectively control a power level or bias point of one or more power amplifiers of the analog front end.

4. The system of claim 1, wherein the one or more parameters comprise one or more of temperature data, power level or bias level data, or calibration data.

5. The system of claim 1, wherein each pre-distortion block comprises:
- a DPD module configured to multiply the signal with the determined DPD data; and
- a digital up converter configured to convert a band of frequencies of the signal from a first frequency to a second frequency that is higher than the first frequency.

6. The system of claim 1, wherein the at least one second device comprises one or more of a second digital beamformer circuit, a computing device, a processing circuit, or a phased array controller.

7. The system of claim 1, wherein deactivated DPD circuit blocks correspond to an area of the analog front end corresponding to a portion of the antenna array that is operating at a temperature in which associated power amplifiers exhibit linearity.

8. The system of claim 1, wherein the activated DPD circuit blocks correspond to an area of the analog front end corresponding to a portion of the antenna array that is operating at a temperature in which associated power amplifiers exhibit linearity.

9. The system of claim 1, further comprising:
- an antenna array coupled to the analog front end including power amplifiers of different sizes; and
- wherein one or more of the controller, a phased array controller, or the at least one second device is configured to perform a power consumption reduction operation by independently activating or deactivating selected ones of the power amplifiers corresponding to different areas of the antenna array.

10. A system comprising:
- a digital beamformer circuit coupled to an analog front end that is coupled to N antenna elements, the digital beamformer circuit comprising:
- a plurality of digital pre-distortion (DPD) circuit blocks, each of which is in a transmission path associated with one of the N antenna elements; and a controller configured to:

determine one or more parameters corresponding to the analog front end;

selectively deactivate one or more of the plurality of DPD circuit blocks corresponding to a first region;

selectively activate one or more of the plurality of DPD circuit blocks corresponding to a second region;

determine DPD data from one or more DPD tables for each activated DPD circuit block based on the one or more parameters; and send one or more control signals to control a power level or bias point for each power amplifier of the analog front end based on the determined DPD data.

11. The system of claim 10, wherein the controller is configured to independently configure each activated DPD circuit block with the determined DPD data to pre-compensate a signal on a per antenna element basis to negate non-linearities introduced by a power amplifier in the transmission path.

12. The system of claim 10, wherein the digital beamformer circuit further comprises:

an input/output (I/O) interface; and wherein the controller sends one or more control interfaces to the analog front end via the I/O interface.

13. The system of claim 10, wherein the one or more parameters comprise one or more of temperature data, power level or bias level data, or calibration data.

14. The system of claim 10, further comprising:

an antenna array coupled to the analog front end including power amplifiers of different sizes; and wherein at least one of the controller, a phased array controller, or one or more second devices is configured to perform a power consumption reduction operation by independently activating or deactivating selected ones of the power amplifiers corresponding to different areas of the antenna array.

15. A system comprising:

a digital beamformer circuit coupled to an analog front end that is coupled to N antenna elements of an antenna array, the digital beamformer circuit comprising:

a plurality of digital pre-distortion (DPD) circuit blocks, each of which is in a transmission path associated with one of the N antenna elements; and a controller configured to:

determine one or more parameters corresponding to the analog front end;

selectively deactivate one or more of the plurality of DPD circuit blocks corresponding to a first region;

selectively activate one or more of the plurality of DPD circuit blocks corresponding to a second region;

determine DPD data from one or more DPD tables for each activated DPD circuit block based on the one or more parameters; and send one or more control signals to control a power level or bias point for each power amplifier of the analog front end based on the determined DPD data to pre-compensate a signal on a per antenna element basis to negate non-linearities introduced by a power amplifier in the transmission path.

16. The system of claim 15, wherein the antenna array coupled to the analog front end includes power amplifiers of different sizes; and the controller is configured to perform a power consumption reduction operation by independently activating or deactivating selected ones of the power amplifiers corresponding to different areas of the antenna array.

17. The system of claim 15, wherein the controller is configured to independently configure each activated DPD circuit block with the determined DPD data to pre-compensate a signal on a per antenna element basis to negate non-linearities introduced by a power amplifier in the transmission path.

* * * * *